(12) United States Patent
Smith

(10) Patent No.: US 8,181,970 B2
(45) Date of Patent: May 22, 2012

(54) UNITIZED BI-DIRECTIONAL SEAL ASSEMBLY

(75) Inventor: Michael A. Smith, Calgary (CA)

(73) Assignee: Freudenberg Oil & Gas, LLC, Plymouth, MI (US)

( * ) Notice: Subject to any disclaimer, the term of this patent is extended or adjusted under 35 U.S.C. 154(b) by 0 days.

(21) Appl. No.: 12/948,215

(22) Filed: Nov. 17, 2010

(65) Prior Publication Data

US 2011/0260411 A1 Oct. 27, 2011

Related U.S. Application Data

(60) Provisional application No. 61/326,901, filed on Apr. 22, 2010.

(51) Int. Cl.
*F16J 15/18* (2006.01)

(52) U.S. Cl. .................................. 277/516; 277/510

(58) Field of Classification Search .............. 277/328, 277/337, 339, 341, 342, 510, 516, 517, 518, 277/603

See application file for complete search history.

(56) References Cited

U.S. PATENT DOCUMENTS

| | | | |
|---|---|---|---|
| 2,264,147 A | 11/1941 | Dunlevy | |
| 2,284,340 A | 5/1942 | Nuckles | |
| 2,285,319 A | 6/1942 | Wheeler | |
| 2,706,655 A | 4/1955 | Showalter | |
| 2,733,969 A | 2/1956 | Polk | |
| 2,968,516 A | 1/1961 | Jarvis | |
| 3,169,776 A | 2/1965 | Felt | |
| 3,188,099 A | 6/1965 | Johnson et al. | |
| 3,342,500 A | 9/1967 | Knudson | |
| 3,885,801 A | 5/1975 | Scannell | |
| 4,040,636 A | 8/1977 | Albertson et al. | |
| 4,053,163 A | 10/1977 | Vegella | |
| 4,103,909 A | 8/1978 | Hoffman et al. | |
| 4,131,287 A | 12/1978 | Gunderson et al. | |
| 4,167,262 A | 9/1979 | Lemmon | |
| 4,169,604 A | 10/1979 | Heathcott | |
| 4,234,197 A | 11/1980 | Amancharla | |
| 4,398,731 A | 8/1983 | Gorman et al. | |
| 4,406,469 A | 9/1983 | Allison | |
| 4,410,189 A | 10/1983 | Myers et al. | |
| 4,428,590 A | 1/1984 | Pippert et al. | |
| 4,438,935 A | 3/1984 | Lees | |
| 4,468,042 A | 8/1984 | Pippert et al. | |
| 4,473,231 A | 9/1984 | Tilton et al. | |
| 4,483,543 A | 11/1984 | Fisher, Jr. et al. | |
| 4,521,040 A * | 6/1985 | Slyker et al. ............. | 285/123.12 |
| 4,588,030 A | 5/1986 | Blizzard | |
| 4,592,558 A | 6/1986 | Hopkins | |
| 4,618,154 A | 10/1986 | Freudenthal | |
| 4,630,636 A | 12/1986 | Cutcher | |

(Continued)

FOREIGN PATENT DOCUMENTS

EP 2159459 A1 3/2010

(Continued)

*Primary Examiner* — Gilbert Lee

(74) *Attorney, Agent, or Firm* — Dan Sepanik, Esq.; Harness, Dickey & Pierce, P.L.C.

(57) ABSTRACT

A seal assembly is provided including a pair of end rings axially spaced from one another. A pair of annular seals are each engaged with a respective one of the pair of end rings. A locking ring is engaged with each of the pair of annular seals to connect the opposing end rings and annular seals in a unitized bi-directional seal assembly.

18 Claims, 5 Drawing Sheets

U.S. PATENT DOCUMENTS

| | | | |
|---|---|---|---|
| 4,635,945 | A | 1/1987 | Beck |
| 4,706,970 | A | 11/1987 | Ramirez |
| 4,811,959 | A | 3/1989 | Bullard et al. |
| 4,900,041 | A | 2/1990 | Hopkins et al. |
| 4,900,067 | A * | 2/1990 | Jansen et al. ............ 285/123.12 |
| 5,297,805 | A | 3/1994 | Merkin et al. |
| 5,306,021 | A | 4/1994 | Morvant |
| 5,309,993 | A | 5/1994 | Coon et al. |
| 5,472,216 | A | 12/1995 | Albertson et al. |
| 5,551,703 | A | 9/1996 | Morvant |
| 5,788,216 | A | 8/1998 | Pittman et al. |
| 6,007,070 | A | 12/1999 | Heathcott et al. |
| 6,318,729 | B1 | 11/2001 | Pitts, Jr. et al. |
| 6,626,438 | B2 | 9/2003 | Walden |
| 6,726,220 | B2 | 4/2004 | Grimanis et al. |
| 6,869,079 | B2 | 3/2005 | Zheng |
| 6,883,804 | B2 | 4/2005 | Cobb |
| 7,216,872 | B1 | 5/2007 | Shaw et al. |
| 7,401,788 | B2 | 7/2008 | Williams et al. |
| 2003/0214100 | A1 * | 11/2003 | Pippert ........................ 277/510 |
| 2008/0029264 | A1 | 2/2008 | Williams et al. |

FOREIGN PATENT DOCUMENTS

GB          1109763 A          4/1968

* cited by examiner

UNITIZED BI-DIRECTIONAL SEAL ASSEMBLY

CROSS-REFERENCE TO RELATED APPLICATIONS

This application claims the benefit of U.S. Provisional Application No. 61/326,901, filed on Apr. 22, 2010. The entire disclosure of the above application is incorporated herein by reference.

FIELD

The present disclosure relates to a seal assembly and more particularly, to a locking mechanism that connects two opposing sealing systems into one unitized bi-directional seal assembly.

BACKGROUND

This section provides background information related to the present disclosure which is not necessarily prior art.

Seal assemblies are often required between a bore and a mandrel in which extreme temperatures upwards of 600° F. and pressures upwards of 10,000 psi are required to be withstood.

SUMMARY

This section provides a general summary of the disclosure, and is not a comprehensive disclosure of its full scope or all of its features.

A seal assembly is provided including a pair of end rings axially spaced from one another. A pair of annular seals are each engaged with a respective one of the pair of end rings. A locking ring is engaged with each of the pair of annular seals to connect the opposing end rings and annular seals in a unitized bi-directional seal assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
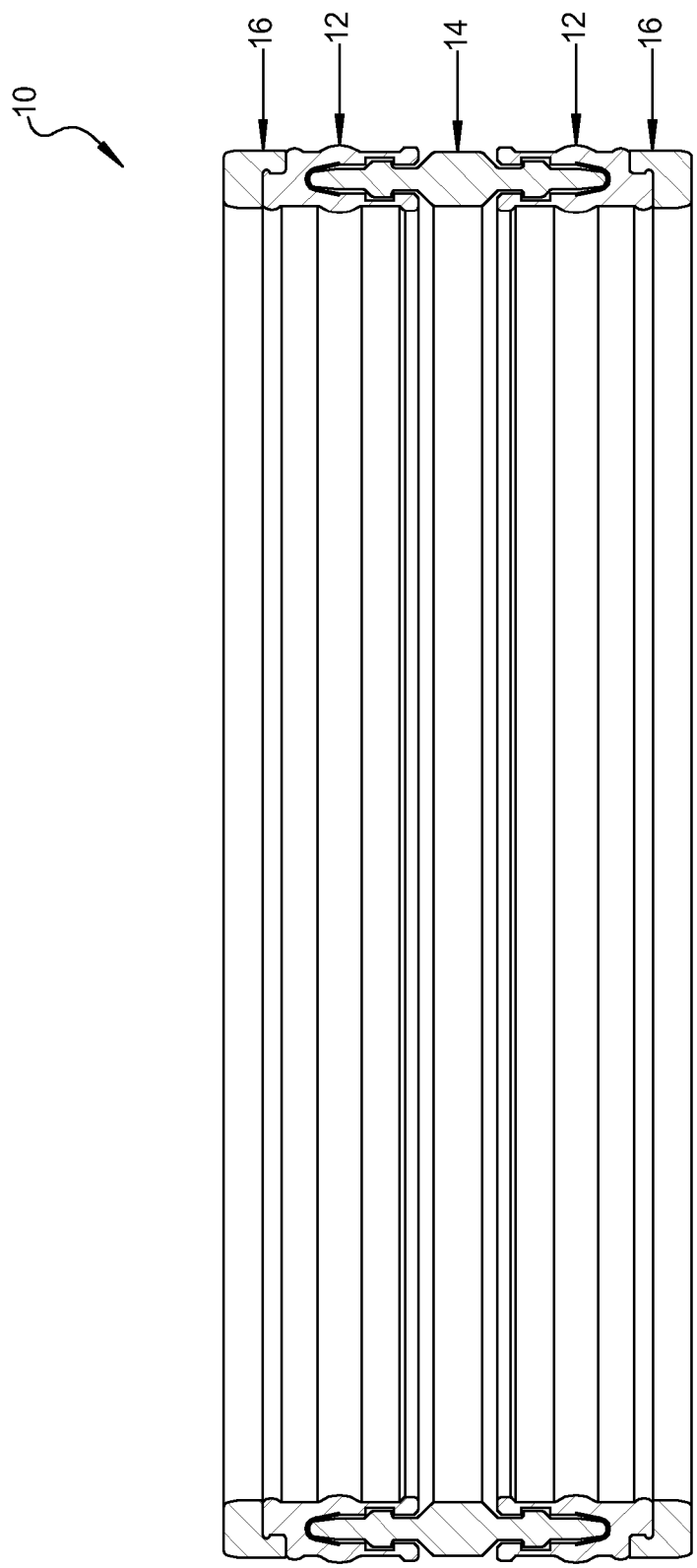
FIG. 1 is a scaled cross-sectional view of a seal assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the unitized bi-directional seal assembly, according to the principles of the present disclosure, will now be described. The seal assembly 10 includes a pair of annular seals 12 connected together by a locking ring 14 and having a pair of end rings 16 engaged with the annular seals 12.

Figure 2:
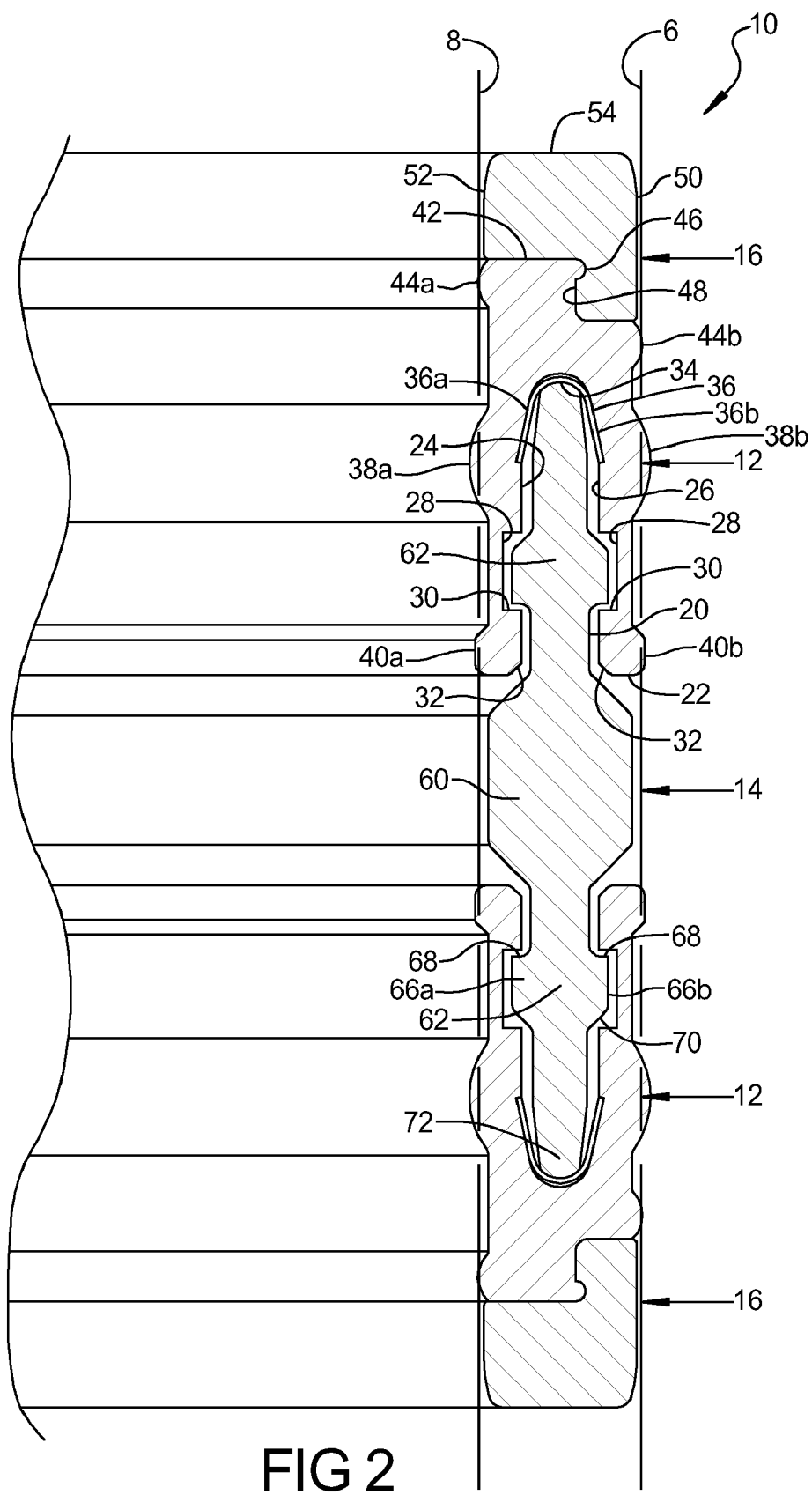
FIG. 2 is an enlarged partial cross-sectional view (drawn to scale) of the seal assembly in FIG. 1.

With reference to FIG. 2, an enlarged partial cross-sectional view of the seal assembly 10 is shown. The seal assembly 10 is designed to be received within a bore 6 and receives a mandrel 8 therein. It should be understood that other arrangements of the seal assembly can also be utilized. The annular seals 12 include a first end 22 having an axially extending channel 20 defined therein. The channel 20 includes inner and outer sidewalls 24, 26. Each of the sidewalls 24, 26 is provided with a recessed groove 28 that defines a locking shoulder 30 at an outboard end thereof. The channel 20 is provided with chamfers 32 at the first end 22. The inboard end 34 of the channel 20 can be provided with an annular spring 36 having a generally U-shaped cross-section. The spring 36 includes inner and outer legs 36a, 36b, respectively, the ends of which are disposed adjacent to radially inwardly and radially outwardly protruding portions 38a, 38b of the annular seal body.

Figure 4:
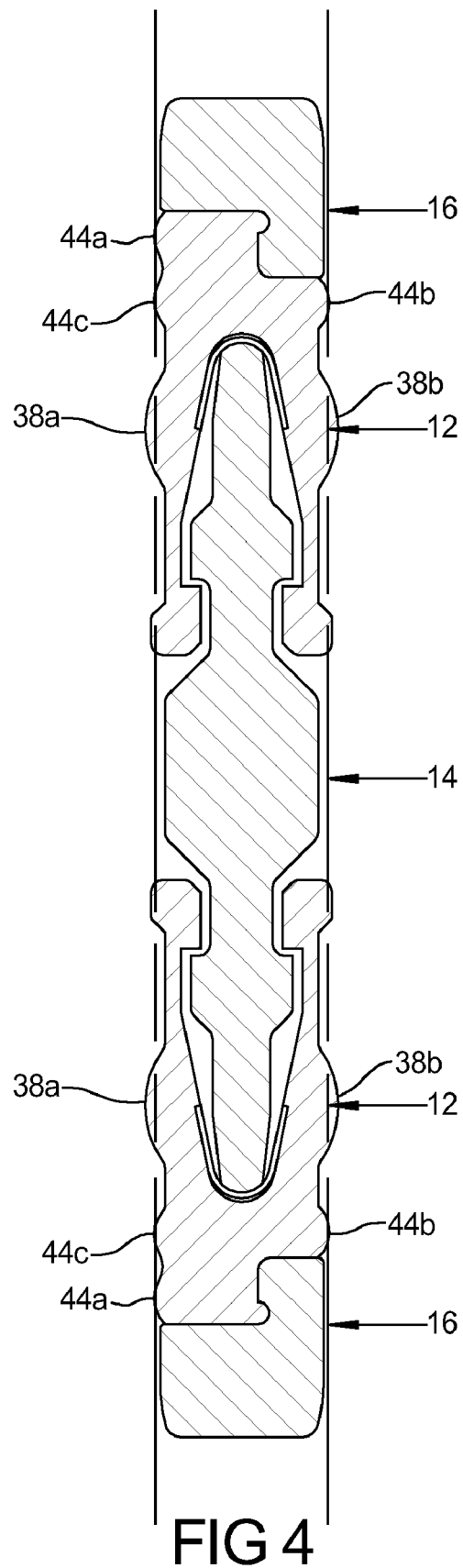
FIG. 4 is an enlarged partial cross-sectional view (drawn to scale) of an alternative seal assembly according to the principles of the present disclosure.
Figure 5:
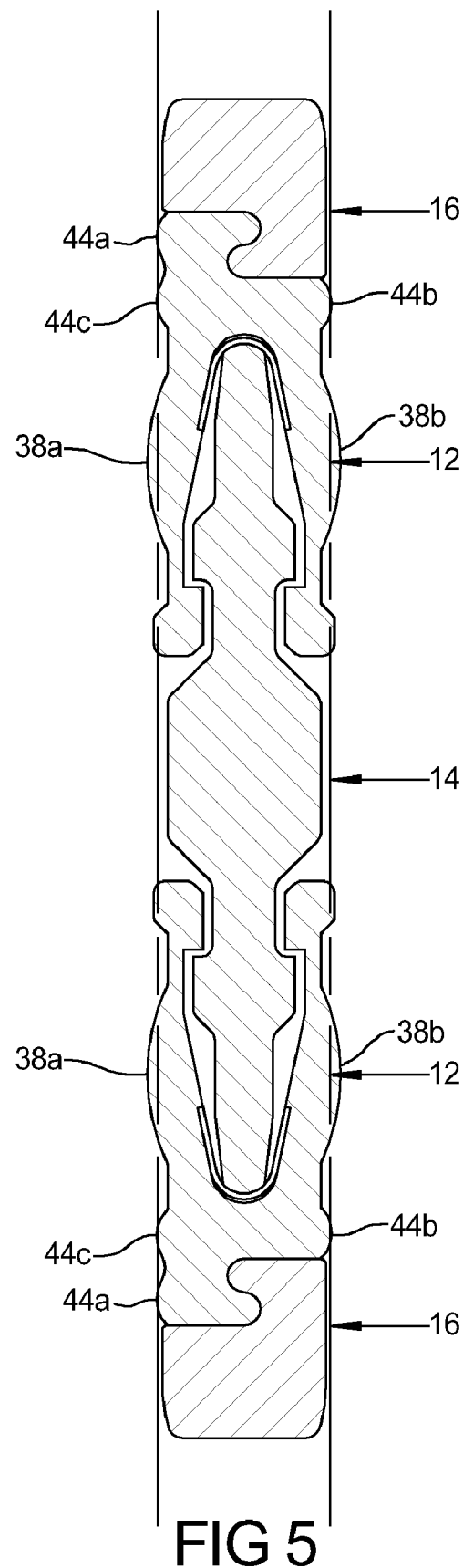
FIG. 5 is an enlarged partial cross-sectional view of an alternative seal assembly according to the principles of the present disclosure.

Annular seal 12 includes the outer protruding portion 38B having a larger diameter than an inner diameter of the bore 6 so that an interference is obtained therebetween. Furthermore, the inner protruding portion 38a is provided with a smaller inner diameter than the outer diameter of the mandrel 8 so that an interference fit is obtained therebetween. The amount of interference between the inner and outer protruding portions 38a, 38b with the mandrel 8 and bore 6 is application specific and can vary for different applications. The width (in the axial direction) of the inner and outer protruding portions 38a, 38b can be narrower (FIG. 4) or wider (FIG. 5) relative to the overall axial length of the annular seal 12, depending upon the specific application. The first end 22 of the annular seals 12 can be provided with inwardly and outwardly extending protruding portions 40a, 40b and the second end 42 of the annular seals 12 can be provided with radially inwardly and outwardly extending protruding portions 44a, 44b, respectively. The radially inwardly and outwardly extending protruding portions 40a, 40b, 44a, 44b are designed to have an interference fit with the mandrel 8 and bore 6. Additional radially inwardly protruding portions 44c can also be provided as shown in FIGS. 4 and 5. The second end 42 of the annular seals 12 can include a snap feature 46 in the form of a protruding rib that can be snap engaged with a corresponding snap feature 48 of the end rings 16. The corresponding snap features 46, 48 are designed as interferences that allow the end rings 16 to be snap fit engaged with the second end 42 of the annular seals 12. The end rings 16 can be attached to the annular seals 12 by other known techniques. The end rings 16 are provided with radially inner and outer surfaces 50, 52, respectively, that are tight fit within the bore 6 and around the mandrel 8, but not necessarily interference fit therewith. The end rings 16 also include a planar end face 54 that faces axially away from the annular seal 12.

The locking ring 14 is provided for engaging with two annular seals 12 on opposite ends thereof. The locking ring 14 includes a body portion 60 and a pair of axially extending locking members 62 that are received in the channels 20 of the pair of annular seals 12. The locking members 62 of the locking ring 14 are defined by an axially extending rim 64 having a pair of radially inwardly and outwardly extending lugs 66A, 66B which are received in the recesses 28 in the sidewalls 24, 26 of the channel 20. The radially inwardly and outwardly extending lugs 66A, 66B each have a ledge 68 facing the body 60 of the locking ring 14 and opposing the ledges 30 of the recesses 28. The inwardly and outwardly extending lugs 66A, 66B also include a beveled edge 70 facing away from the body 60 of the locking ring 14. The beveled edges 70 facilitate the insertion of the locking member 62 into the channel 20 of the annular seals 12. A tip portion 72 of the locking members 62 can be received between the legs 36a, 36b of the springs 34 and/or between the radially inwardly and outwardly protruding portions 38a, 38b of the annular seals 12 in order to prevent the channel 20 from being collapsed.

The locking ring 14 enables the two opposing seal systems 12, 16 to be connected into a unitized assembly thereby reinforcing the radial and axial strength of the assembly 10 against the effects of thermal expansion and pressure. The use of the locking ring 14 also simplifies the installation of the seal assembly 10, as there is only one component versus multiple components to assemble.

The seal assembly 10 is designed to be utilized in high temperature and high pressure environments including temperatures upwards of 600° F. TO 700° F. and pressures upwards of ten to twenty-five thousand psi. It is anticipated that the locking ring 14 can be made form glass-filled polyether ether ketone (PEEK) and that the end rings 16 can be made from carbon-filled polyether ether ketone (PEEK), although other thermoplastics having appropriate mechanical and chemical resistant properties or other materials could also be utilized. The annular seals 12 can be made form a carbon-filled PTFE, although it is anticipated that other materials may also be utilized, depending upon the temperature and pressure requirement of the application. The annular springs 34 can be made from stainless steel materials or other spring steels that can be tempered. An exemplary material that is believed to be useful in this application is available under the name Elgiloy.

Figure 3:
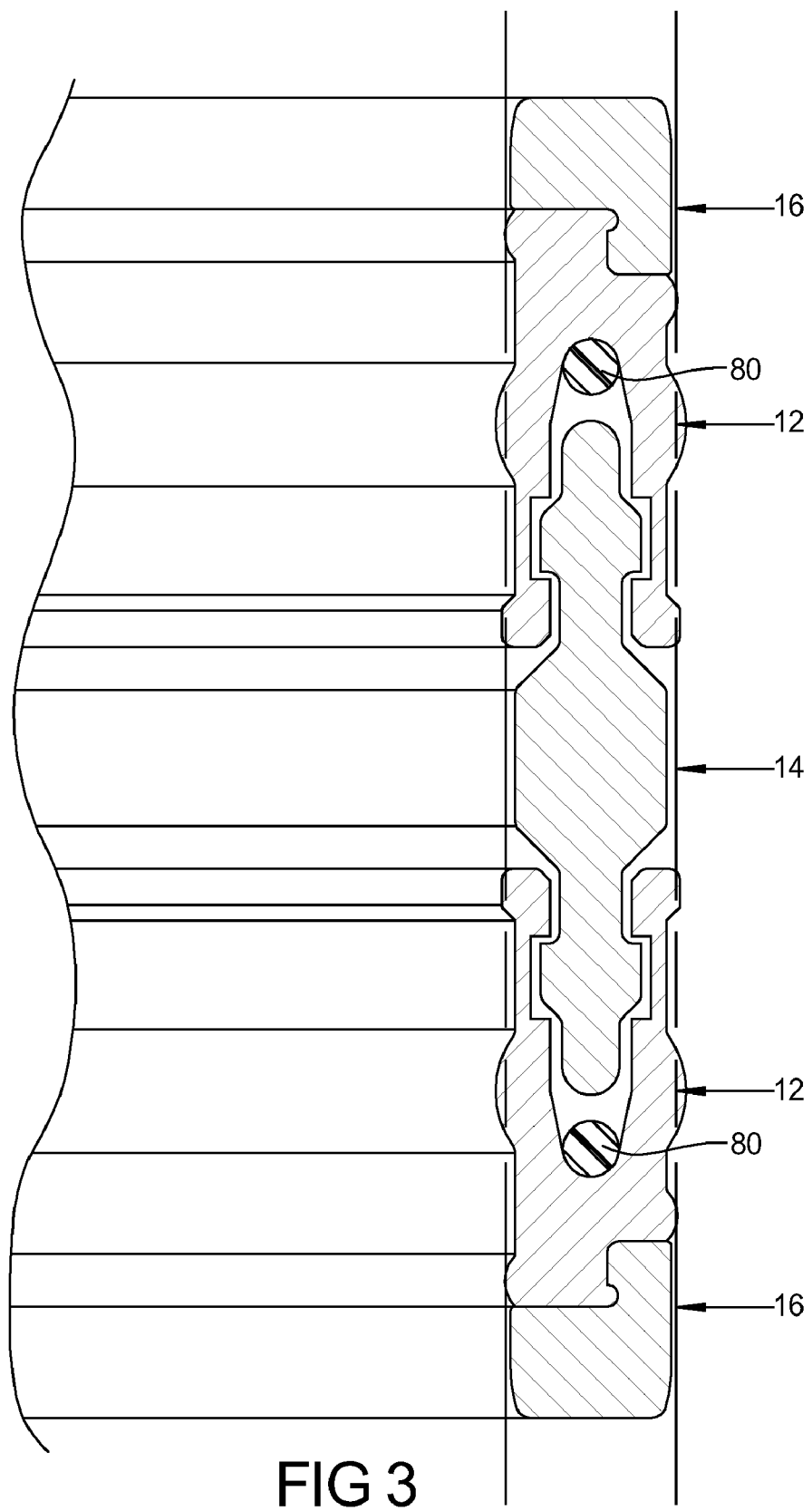
FIG. 3 is an enlarged partial cross-sectional view (drawn to scale) of an alternative seal assembly according to the principles of the present disclosure.

As illustrated in FIG. 3, an alternative embodiment is shown where the spring 34 is eliminated and replaced with an O-ring 80 that is inserted in the end of the channel 20 and that serves as a spring for preventing collapse of the channel 20 under heavy pressure. It is anticipated that the O-ring could be formed of many materials, but needs to be resistant to the desired heat and pressure requirements of a given application.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A seal assembly, comprising:
a pair of end rings axially spaced from one another;
a pair of annular seals each engaged with a respective one of said pair of end rings and each including a channel therein with a locking shoulder facing away from an opening end of said channel; and
a locking ring including a first locking member at a first end and a second locking member at a second end and said first and second locking members being each received in a respective receiving channel of said pair of annular seals and having a ledge portion each engaged with a respective one of said locking shoulders of each of said pair of annular seals, wherein said pair of annular seals have an innermost diameter that is smaller than an innermost diameter of said locking ring and have an outermost diameter that is larger than an outermost diameter of said locking ring.

2. The seal assembly according to claim 1, wherein said pair of end rings include a locking feature adapted to directly engage a complementary locking feature of said respective one of said pair of annular seals.

3. The seal assembly according to claim 1, wherein said receiving channel of each of said annular seals include an annular spring disposed therein, said annular spring having a U-shaped cross-section.

4. The seal assembly according to claim 3, wherein said first and second locking members of said locking ring are received in a respective one of said annular springs of said annular seals.

5. The seal assembly according to claim 4, wherein said pair of annular seals each include radially inner and outer sidewalls, at least one of said radially inner and outer sidewalls having a protrusion disposed radially spaced from an arm portion of said annular spring.

6. The seal assembly according to claim 1, wherein said locking ring includes a body disposed between said first and second locking members, said first and second locking members each including an axially extending rim having a pair of radially inwardly and outwardly extending lugs each having a ledge facing said body and a beveled edge facing away from said body.

7. The seal assembly according to claim 6, wherein said receiving channel of said pair of annular seals include radially inner and outer sidewalls each having a recess therein receiving said radially inwardly and outwardly extending lugs of said pair of locking members.

8. The seal assembly according to claim 1, wherein said pair of end rings are made from a thermoplastic material.

9. The seal assembly according to claim 1, wherein said locking ring is made from a thermoplastic material.

10. The seal assembly according to claim 1, wherein said pair of annular seals are made from PTFE or modified PTFE.

11. The seal assembly according to claim 1, wherein said locking ring and said pair of annular seals are assembled together by inserting said first and second locking members in said receiving channels of said pair of annular seals to secure the pair of annular seals to the locking ring as a unitized seal.

12. The seal assembly according to claim 1, wherein said receiving channel of each of said annular seals include an annular spring disposed therein.

13. A seal assembly, comprising:
a pair of annular seals each including a receiving channel therein with a locking shoulder facing away from an opening end of said channel; and
a locking ring including a first locking member at a first end and a second locking member at a second end and said first and second locking members being each received in a respective receiving channel of said pair of annular seals and having a ledge portion each engaged with a respective one of said locking shoulders of each of said pair of annular seals, wherein said pair of annular seals have protruding inner and outer seal portions defining an innermost diameter portion and an outermost diameter portion, respectively of the annular seals, wherein the innermost diameter portion of said pair of annular seals is smaller than an innermost diameter of said locking ring and an outermost diameter portion of said pair of annular seals is larger than an outermost diameter of said locking ring; and
a pair of end rings axially spaced from one another and engaged with said pair of annular seals.

14. The seal assembly according to claim 13, wherein said pair of end rings are made from a thermoplastic material.

15. The seal assembly according to claim 13, wherein said locking ring is made from a thermoplastic material.

16. The seal assembly according to claim 13, wherein said pair of annular seals are made from PTFE or modified PTFE.

17. The seal assembly according to claim 13, wherein said pair of end rings include a locking feature adapted to directly engage a complementary locking feature of said respective one of said pair of annular seals.

18. The seal assembly according to claim 13, wherein said locking ring and said pair of annular seals are assembled together by inserting said first and second locking members in said receiving channels of said pair of annular seals to secure the pair of annular seals to the locking ring as a unitized seal.

\* \* \* \* \*